Dec. 25, 1951  C. G. PULLIN ET AL  2,579,860
AIRCRAFT WITH ROTARY WINGS
Filed July 29, 1947  10 Sheets-Sheet 4
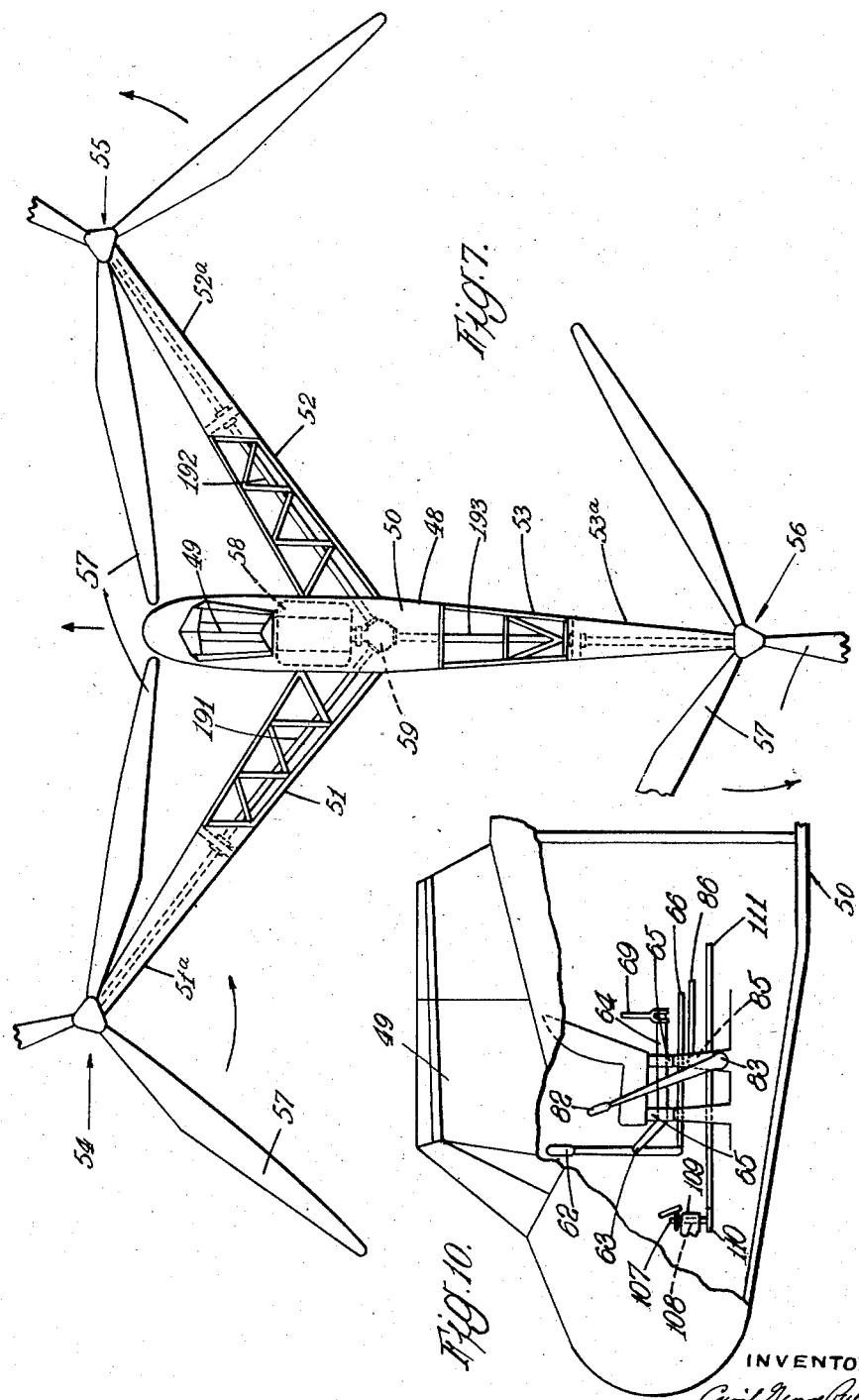
INVENTORS

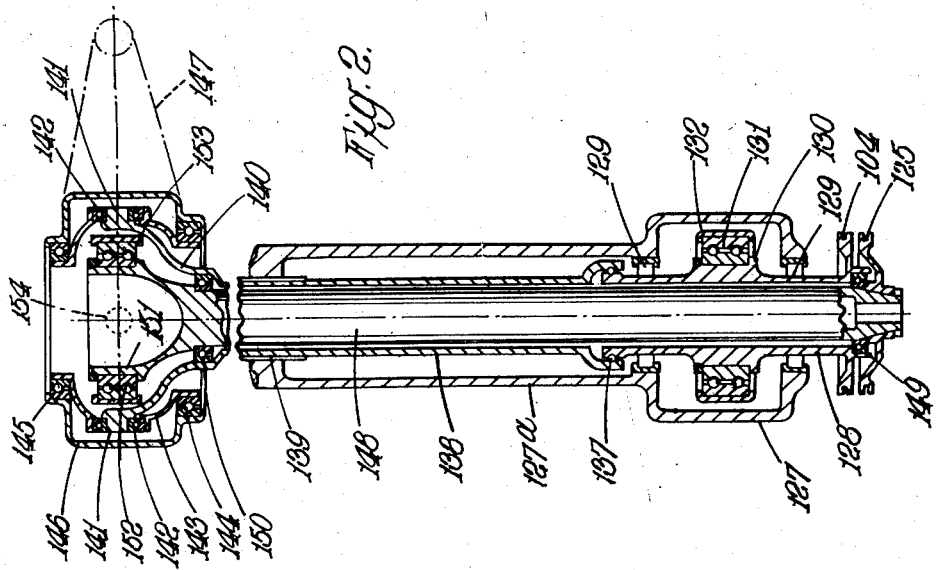

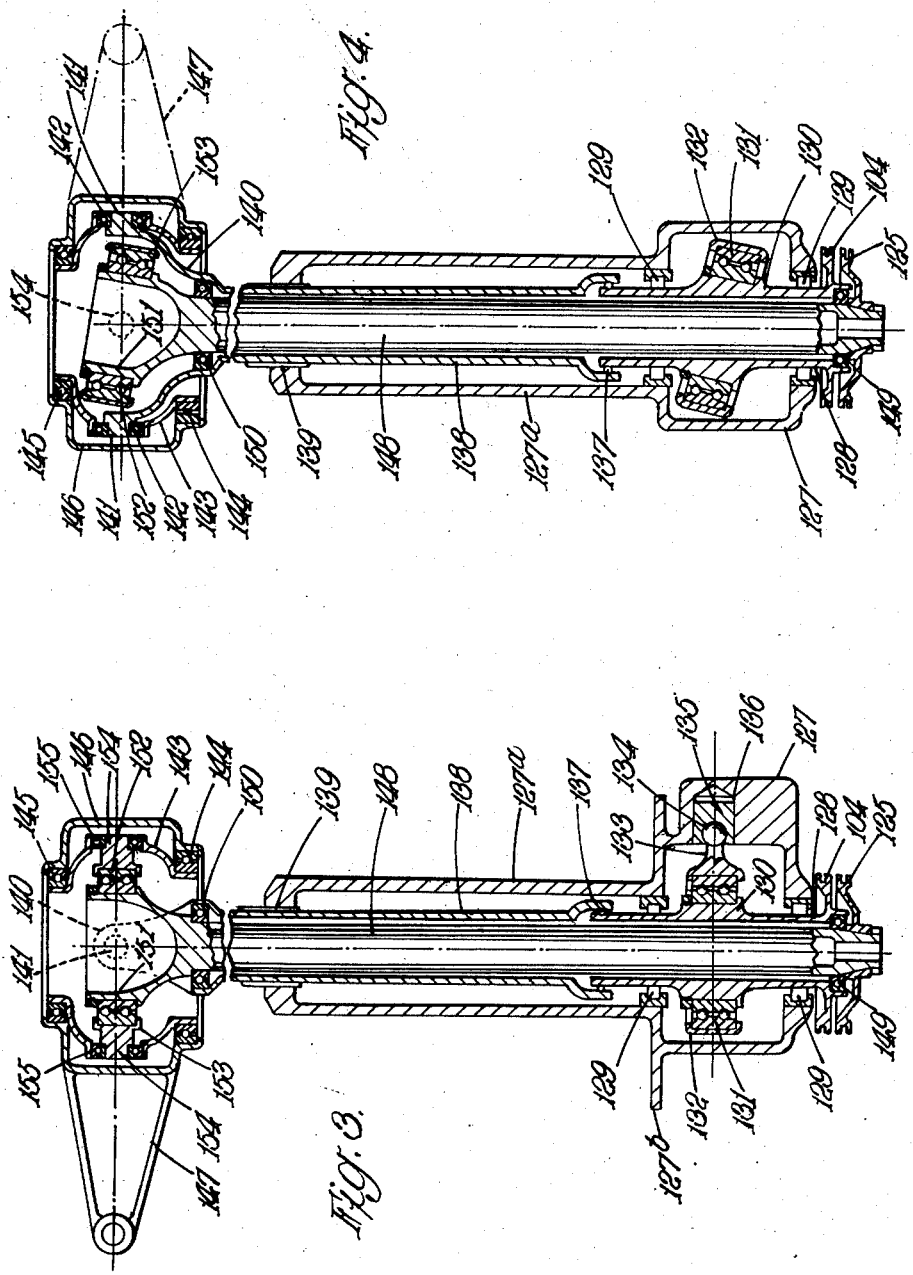

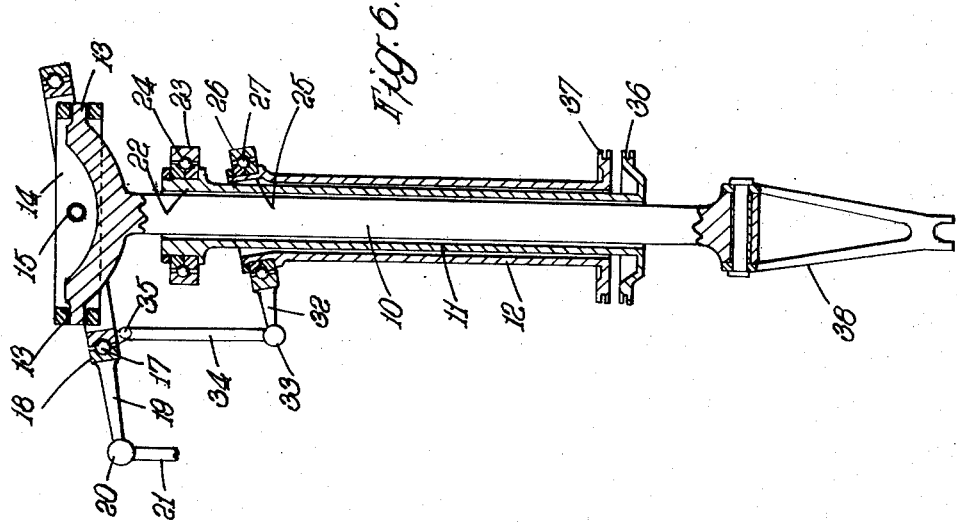
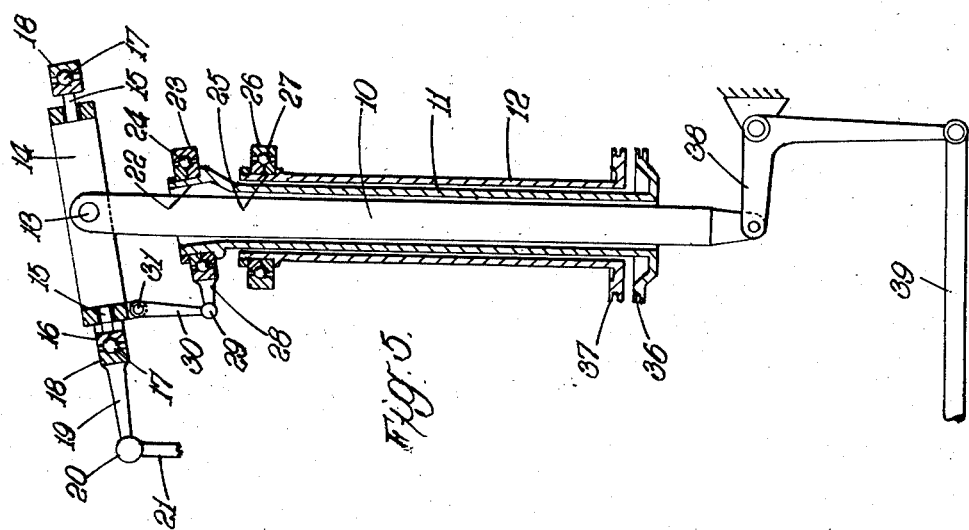

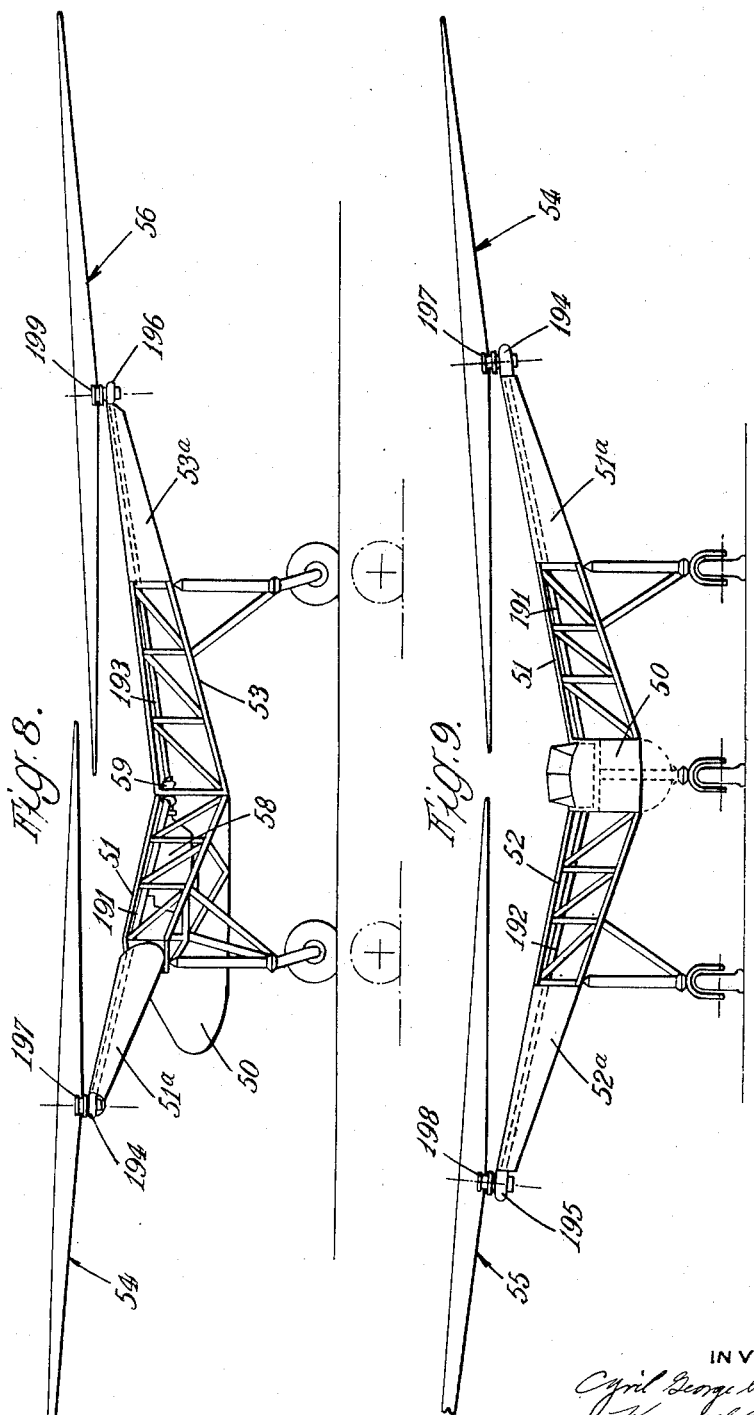

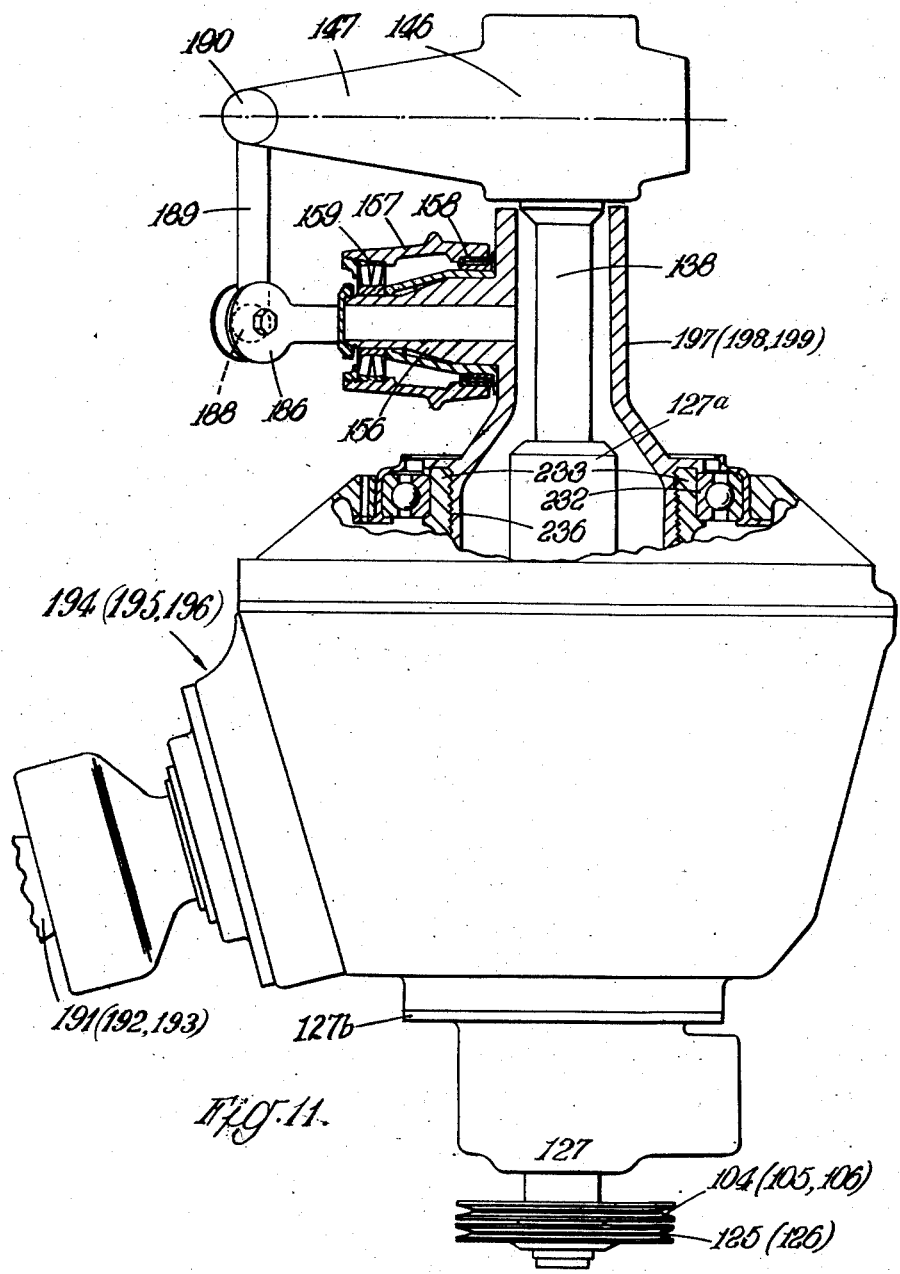

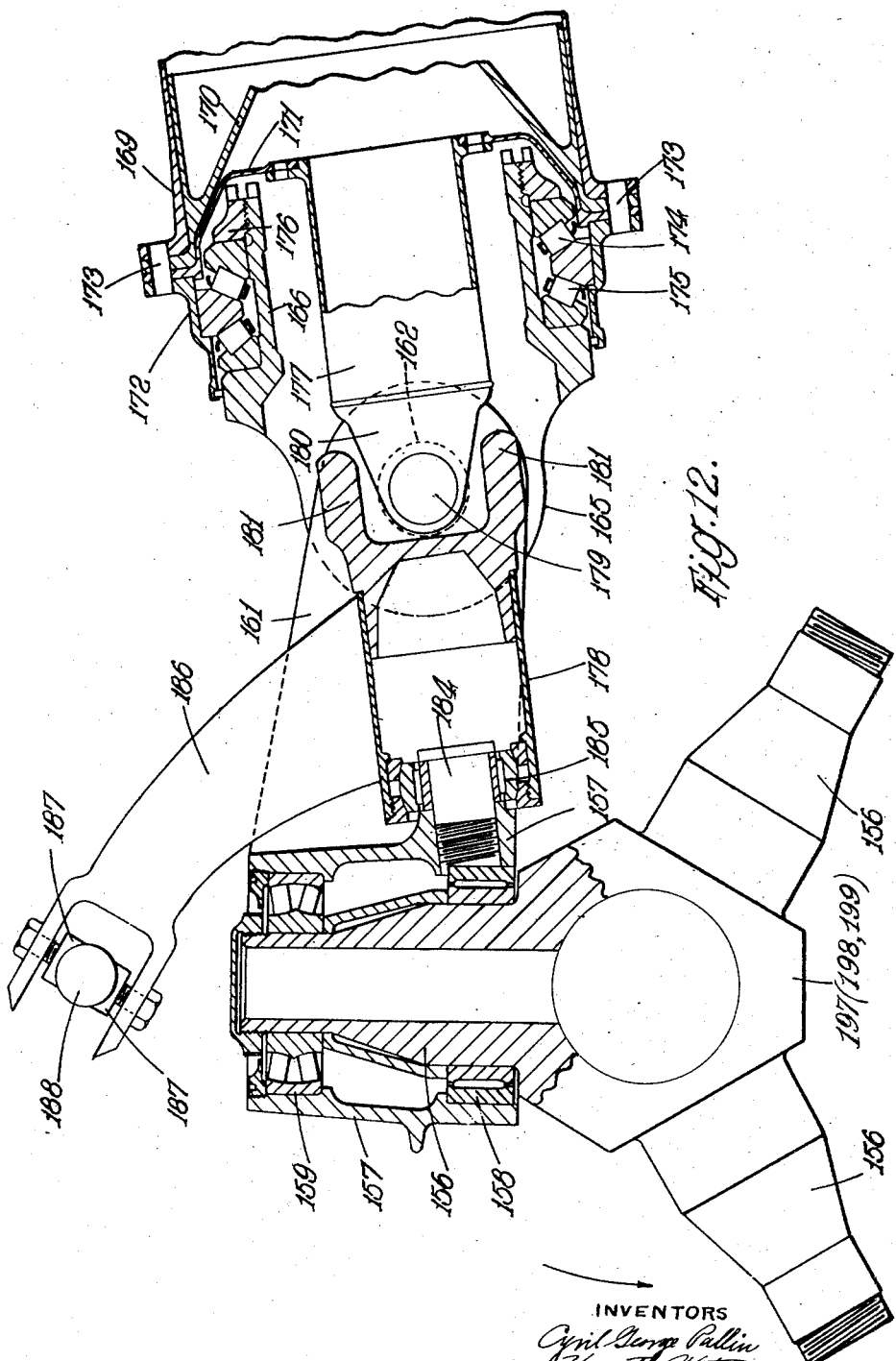

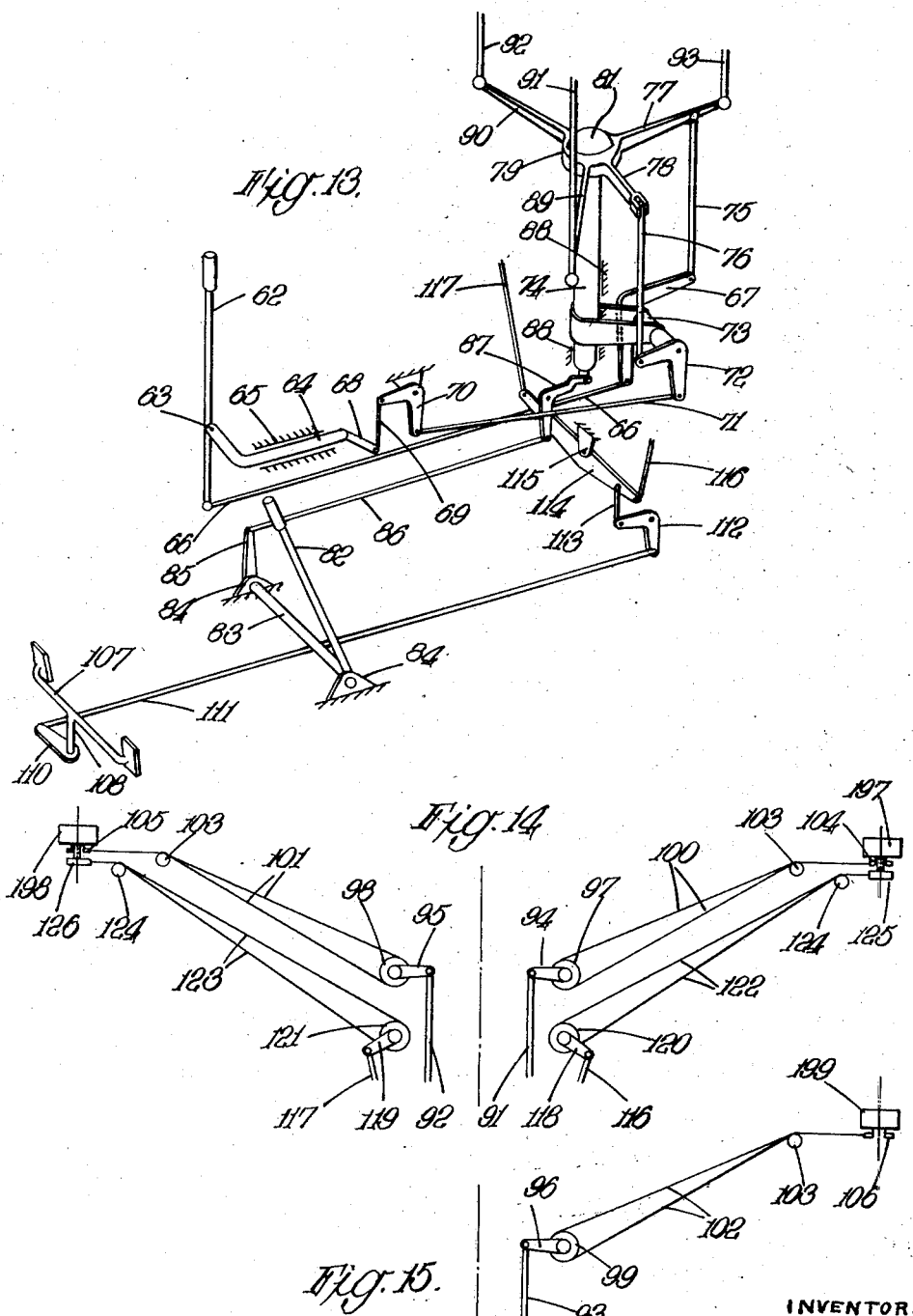

Dec. 25, 1951      C. G. PULLIN ET AL      2,579,860
                AIRCRAFT WITH ROTARY WINGS
Filed July 29, 1947                        10 Sheets-Sheet 9
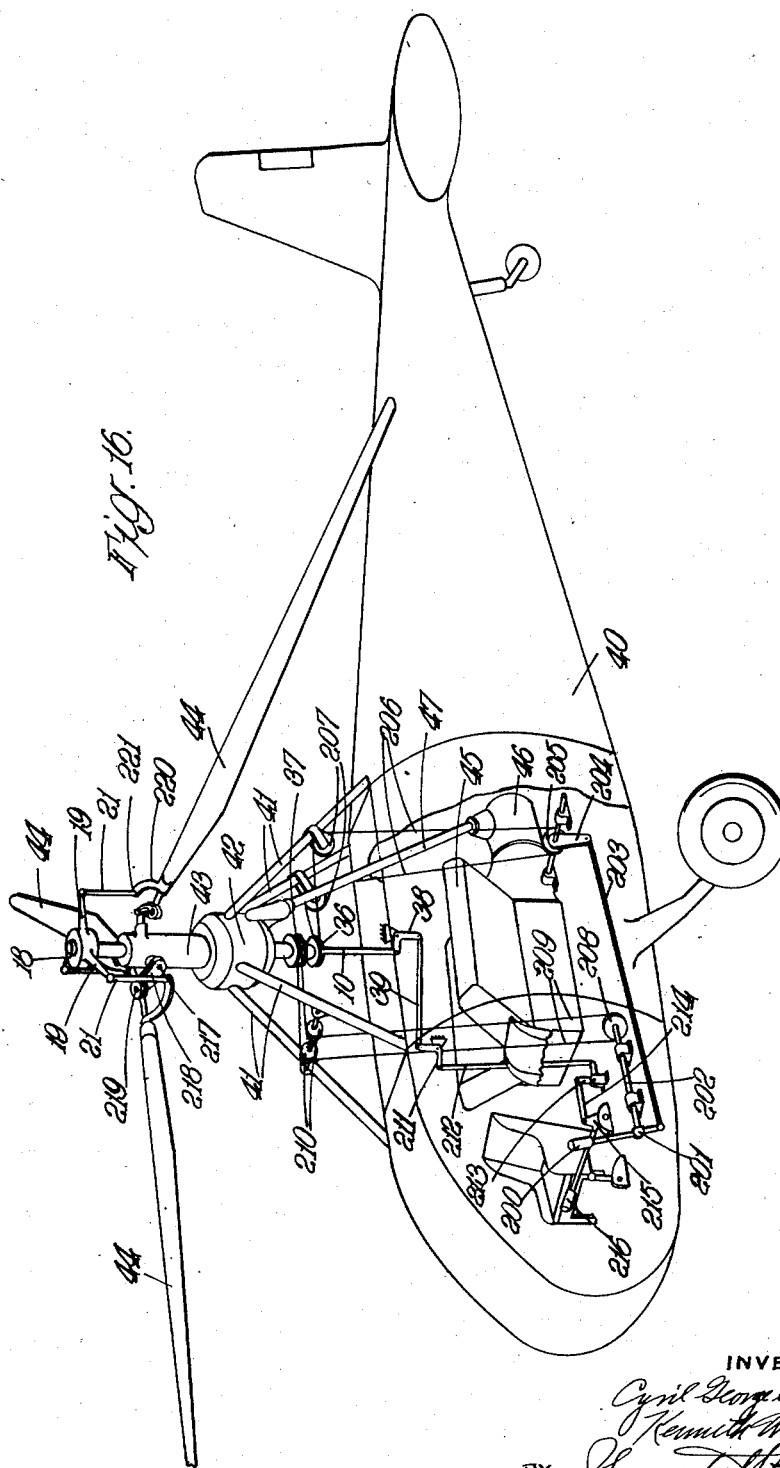
INVENTORS
Cyril George Pullin
Kenneth Watson
BY
   ATTORNEYS

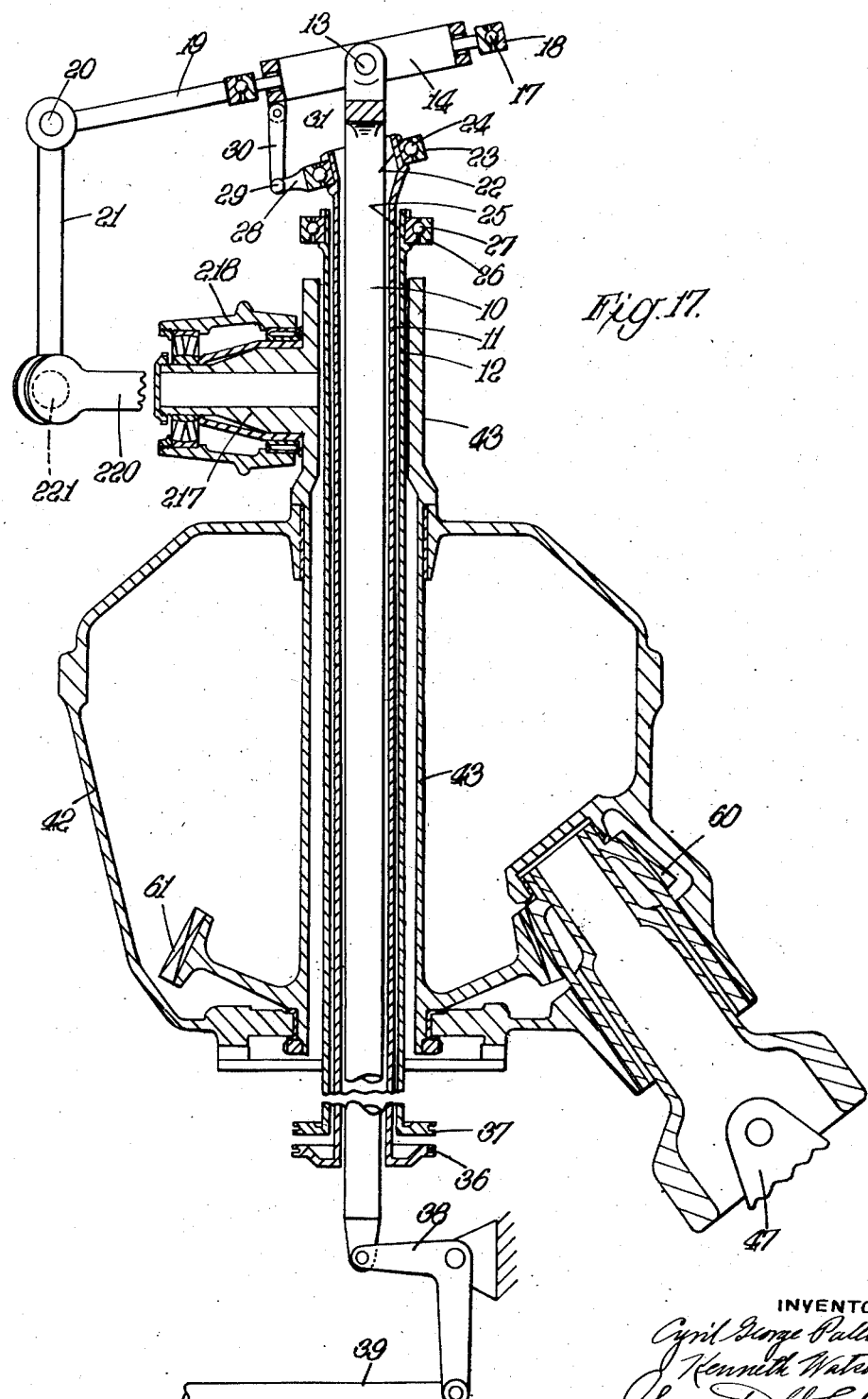

Patented Dec. 25, 1951

UNITED STATES PATENT OFFICE 2,579,860

AIRCRAFT WITH ROTARY WINGS

Cyril George Pullin, Tadburn, Ampfield, and Kenneth Watson, Woolston, Southampton, England, assignors, by mesne assignments, to Autogiro Company of America, Philadelphia, Pa., a corporation of Delaware Application July 29, 1947, Serial No. 764,493
In Great Britain July 30, 1946

4 Claims. (Cl. 170—160.25)

The object of this invention is an improvement in the control mechanism of a helicopter, rotaplane or like rotary-winged aircraft having a lifting or sustaining rotor (or rotors) with vertical axis and means for "collective" (or "mean") or/and "cyclic" pitch control of the rotor blades. The improvement with which this invention is concerned is in that part of the control mechanism forming part of the rotor hub assembly.

The improved mechanisms according to this invention for collective and cyclic pitch control respectively have the common feature that rotary displacement of a shaft element coaxial with the rotor hub, is converted into axial displacement (for collective pitch control), or rocking displacement about an axis perpendicular to the hub axis (for cyclic pitch control), of a spider or swash-plate which rotates with the hub and is connected to the rotor blades for effecting pitch angle variations, the conversion of rotary into axial or rocking displacement being effected by means of a Z-crank integral with the shaft element and carrying a loose ring, which is positively prevented from rotating relatively to the airframe and is substantially located with respect to the spider or swash-plate at one point and with respect to the airframe at another point, one of these points being on the axis of rotation and the other offset therefrom, so that the resolved component in a fixed plane containing the shaft axis of the angular displacement of the loose ring caused by partial rotation of the Z-crank is communicated to the spider or swash-plate to effect the desired movement thereof.

For axial displacement of the spider or swash-plate, the loose ring is anchored to the airframe at a substantially fixed point offset from the axis of the shaft element, causing the latter to move axially when it is rotated and transmit its axial movement to the spider or swash-plate. For rocking displacement the loose ring is connected at a point offset from the axis of rotation to the non-rotary member of the swash-plate assembly, which member is mounted with freedom to rock about one axis not passing through the mentioned offset point, or about two axes independently. This causes the offset point to be displaced axially when the Z-crank is partially rotated and impart a rocking displacement to the swash-plate assembly.

The nature of the invention will be better understood from the following description of two specific examples with reference to the accompanying drawings, of which Figs. 1 to 6 are the drawings accompanying the provisional specification. In the drawings:

Figs. 1 and 2 are mutually perpendicular axial sections of the first specific example of the invention;

Figs. 3 and 4 are views similar to Figs. 1 and 2 respectively with the Z-cranks displaced through 90°;

Figs. 5 and 6 are mutually perpendicular axial sections of the second specific example of the invention;

Figs. 7 to 9 are general arrangement views in plan, side and front elevation respectively of a three-rotor helicopter embodying control mechanism as shown in Figs. 1 to 4;

Figs. 10 is an enlargement of the forward part of the showing of Fig. 8, partly "cut-away" to show additional detail;

Fig. 11 is a part-sectional elevation of one rotor hub assembly of the helicopter of Figs. 7 to 9;

Fig. 12 is a part-sectional plan view of the mounting of one rotor blade on the hub assembly of Fig. 11;

Figs. 13 to 15 are schematic representations of the control circuits of the helicopter of Figs. 7 to 10, Figs. 13 being a perspective view of the circuit parts connected to the cockpit controls, and Figs. 14 and 15 being, respectively, front and side elevations of the circuit parts connected to the mechanism shown in Figs. 1 to 4;

Fig. 16 is a schematic perspective view of a single-rotor helicopter embodying control mechanism as shown in Figs. 5 and 6;

Fig. 17 is a sectional elevation on an enlarged scale of the rotor-hub assembly of Fig. 16.

In the specific example of Figs. 1 to 4, the collective pitch control mechanism is operated by the pulley 104; and the cyclic pitch control mechanism is operated by the pulley 125.

The pulley 104 has an integral hollow shaft 128, coaxial with the rotor hub and supported in a fixed housing 127, by bearings 129, in which it can rotate and slide axially. The shaft 128 has an enlargement 130 in the form of a Z-crank carrying an inclined ring 132 on a bearing 131. The ring 132 is prevented from turning, when the pulley 104 and Z-crank 130 are rotated, by an integral arm 133 terminating in a ball 134 located in a socket 135, which can slide radially of the axis of shaft 128 in a pocket 136 formed in the housing 127. Rotation of the Z-crank 130 by the pulley 104 rotates the vertical plane in which the ring 132 is inclined without rotating the ring itself, and since the ring is anchored at the centre of ball 134 its centre is caused to shift axially of the shaft 128 causing this shaft to rise or fall.

The axial displacement of shaft 128 is transmitted through a bearing 137 to an extension sleeve 138 which is prevented from rotating by a splined joint 139 in which sleeve 138 is supported by the upper end of a tubular extension 127ᵃ of the fixed housing 127 lying coaxially within the rotor hub assembly. The sleeve 138 supports a rotary swash-plate 146 whose arms 147 are connected to rotor blade pitch changing levers, so that axial displacement of shaft 128 and sleeve 138 applies collective pitch angle variation to the rotor blades.

The swash-plate 146 rotates on bearings 144, 145 carried by a hollow centre member 143, which is supported in bearings 142 on trunnions 141 integral with a fork 140 constituting an extension of the sleeve 138, which is prevented from rotating by the splines 139. The swash-plate is therefore free to rock about one horizontal axis only, namely the axis of trunnions 141, since the sleeve 138 does not rotate. Rocking of the swash-plate about the axis of trunnions 141 therefore pro-provides cyclic pitch control of invariable phase whose zero is in the vertical plane perpendicular to the trunnion axis, since the arm 147 is advanced substantially 90° in the direction of rotation of the rotor from the radial axis of the rotor blade to which it is connected; and this causes the plane containing the blade tip path, and consequently the lift vector, to reproduce the angular displacement of the swash-plate about the axis of trunnions 141.

Rocking of the swash-plate 146 for cyclic pitch control is effected by rotation of the pulley 125, which is mounted on a shaft 148 supported coaxially in the shaft 128 and sleeve 138 by bearings 149, 150. The shaft 148 terminates in an inclined crank 151, in effect a Z crank, which carries, on bearings 152, an inclined ring 153 having trunnions 154. The member 143 has a second set of bearings 155, whose axis is perpendicular to that of the bearings 142 supported on the trunnions 141; and the trunnions 154 engage the bearings 155. Rotation of the shaft 148 by the pulley 125 rotates the plane in which the crank 151 and trunnion ring 153 is inclined; and consequently the axis of the trunnions 154 which cannot rotate, being located in plan by the centre member 143, is caused to rock about the axis of trunnions 141 and impart its rocking displacement to the centre member 143 and swash-plate 146.

The neutral position of both the collective and cyclic pitch controls is shown in Figs. 3 and 4. Figs. 1 and 2 show the positions taken up when the collective pitch control pulley 104 has been rotated through 90° in the direction for lowering the pitch by lowering the swash-plate 146. This is the minimum pitch position, 90° rotation in the opposite direction giving maximum pitch. Figs. 1 and 2 also show the positions attained when the cyclic pitch control pulley 125 has been rotated through 90° to give maximum inclination of the swash-plate 146 and maximum amplitude of cyclic pitch variation. 90° rotation of the pulley 125 in the reverse direction of course gives cyclic pitch variation of maximum amplitude and opposite sign.

If the pulley 125 could be rotated through 360°, the cyclic pitch amplitude would be varied from minimum, through zero (at 90° rotation), to maximum (at 180°) and back through zero (at 270°) to minimum (360°). It will therefore be clear that the sign of the cyclic pitch control depends on which half of the complete 360° rotation is used; and consequently the sign of the control can be reversed by rotating the pulley through 180°.

Since the control reverses at 90° displacement of the operating pulley 125 from the neutral position, and the ratio, change of cyclic pitch amplitude/control displacement is not constant, becoming progressively less as the 90° position is approached, it is preferred to use less than 180° of total displacement of the pulley 125. The above mentioned ratio remains fairly constant for displacements up to ±50° and a total range of 120° may be considered suitable. Any sacrifice of maximum amplitude of cyclic pitch control thus entailed may be made good by increasing the inclination of the inclined crank 151.

The foregoing paragraph also applies, mutatis mutandis, to the collective pitch control mechanism, the characteristics of which as regards the ratio, change of collective pitch angle/control displacement, are similar.

Axial displacement of pulleys 104 and 125 when the collective pitch control is operated is accommodated by giving a sufficiently long "lead-in" to the operating cables.

Referring to Figs. 7 to 9, the helicopter has a body 50 provided with three outriggers 51, 52, 53 arranged at angles of 120° in plan, the outrigger 53 being in the fore and aft vertical plane of symmetry of the helicopter whose normal (forward) direction of travel is indicated by an arrow in Fig. 7. The inboard parts 51 to 53, of the outriggers are constructed as lattice girders and their outboard parts 51$^a$, 52$^a$, 53$^a$ are of monocoque construction. The outriggers support three identically similar three-bladed rotors 54, 55, 56 having identically similar blades 57; and all three rotors rotate counter-clockwise as seen from above, the directions of rotation being indicated by arrows in Fig. 7. All three rotors are driven by a single engine 58 through distribution gears housed in a distributive gear-box 59 and through "high-speed" transmission shafts 191, 192, 193 respectively. At the ends of the outriggers are mounted gear-boxes 194, 195, 196 containing speed-reduction gearing through which the hubs 197, 198, 199 of the rotors are driven.

The body proper is covered with a skin 48; the pilot's cabin is in the fore part of the body and is indicated at 49 in Figs. 7 and 10.

Referring now to Figs. 11 and 12, each hub 197 (198 or 199) is connected by a screwed joint 236 with a sleeve 233 which is rotatably supported by a bearing 232 in the appropriate gear box 194 (195 or 196) containing gearing by which the drive is transmitted from shaft 190 (192 or 193) to the sleeve 233. The lift of the rotor is transmitted from sleeve 233 to the gear box 194 (195 or 196) through the bearing 232.

The hub 197, 198 or 199 of each rotor has three flapping pivot pins 156, whose axes intersect the hub axis at included angles of 120°. Thus there is no "flapping-pivot offset." Each flapping pivot pin carries a drag link 157 on an inboard needle roller bearing 158 and an outboard double-row self-aligning roller bearing 159. The drag link is forked and its fork-ends 161 support coaxial drag pivot pins 162, on which the ends 165 of a forked blade root stub 166 are journaled. The blade root, which consists of four elements 169, 170, 171 and 172, bolted together at 173, rotates on the stub 166 for pitch angle variation, being mounted by means of a bearing assembly comprising a taper roller thrust and radial bearing 174, a taper-roller pre-load bearing 175, and a pre-loading collar 176 with buttress threads, screwed onto the stub 166.

The diaphragm element, 171, of the blade root carries an inboard extension 177, which is coaxial with the blade root and is connected to a pitch-change torque tube 178 by a universal joint 179, 180, 181 centred on the drag pivot axis.

The inboard end of the torque-tube 178 is supported by means of a needle roller bearing 185 on a stud 184, screwed into the drag link 157; and the torque-tube has an integral lever 186 whose forked end carries spherical seating elements 187 of a ball joint, of which the ball 188 is formed on the end of a vertical link 189, as shown in Fig. 11, which also shows that the other end of the link 189 is connected by a ball joint 190 with one of the arms 147 of swash-plate 146 (see also Figs. 1 to 4).

The centre of the ball joint 187, 188 is aligned in plan on the axis of the flapping pivot pin 157, thus obviating any interaction between flapping and pitch angle, and this alignment is maintained, notwithstanding displacements of the blade on the drag pivot by the circumstance that the alignment of the torque-tube 178 with respect to the drag link is maintained constant by the spigot bearing 184, 185 and the universal joint 179—181, centred on the drag pivot axis, which joint accommodates displacements about the last named axis, while transmitting pitch-changing displacements to the rotor blade.

The housing 127, shown also in Figs. 1 to 4, is mounted coaxially with the gear-box 194 (195 or 196), being secured to it by a flange 127ᵇ, and the extension 127ᵃ is enclosed within the gear-box and hub 197 (198 or 199).

Referring now to Figs. 10 and 13 to 15, a control column 62 is pivoted at 63 for fore and aft movement on a rocking shaft 64 supported in bearings 65. Fore and aft movement of the control column is transmitted by means of a push-pull rod 66 to the vertical arm of a bell-crank 67; and lateral movement of the control column is transmitted by the rocking shaft 64 and a crank 68 fixed thereto, through a link 69, a bell-crank 70 and a push-pull rod 71, to the vertical arm of a bell-crank 72. The bell-cranks 67, 72 are pivoted on a bracket 73 secured to a vertical pillar 74, and their horizontal arms are respectively connected by vertical links 75 and 76 with arms 77 and 78 of a horizontal spider 79, the arm 77 being fore and aft and rearwardly directed and the arm 78 being at right angles to arm 77 and directed to port. The spider is mounted concentrically on pillar 74 by means of a universal joint 81 (here shown as a ball joint, which will be provided with means (not shown) preventing rotation of the spider) and it will be seen that the linkage described transmits fore and aft and lateral rocking of the control column to the spider, so that the latter repeats the displacements of the control column.

A "pitch-change" lever 82 is mounted on a transverse rocking shaft 83 supported in bearings 84 and carrying a crank 85 which is connected by a push-pull rod 86 to the vertical arm of a bell-crank 87, whose horizontal arm is connected to the pillar 74, which slides vertically in guides 88. Operation of the pitch-change lever thus raises and lowers the spider 79 bodily.

The spider 79 has two other horizontal arms 89 and 90 disposed at angles of 120° with arm 77 and with one another. The arms 89, 90, 77 are connected at equal radii from the centre of the spider with vertical links 91, 92, 93 whose other ends are respectively connected to cranks 94, 95 and 96, operating pulleys 97, 98 and 99, which carry cables 100, 101 and 102 respectively. The latter are led over jockey pulleys 103 and operate pulleys 104, 105 and 106 coaxial with the several rotor hubs. These pulleys operate the collective pitch control mechanisms of the several rotors, as described with reference to Figs. 1 to 4. It will be seen that raising or lowering of the spider 79 in response to operation of the pitch change lever 82 applies equal rotations in the same sense to all three pulleys 104, 105 and 106 to vary the collective pitch angles of all the rotors equally in the same sense; and that rocking of the spider on its universal joint in response to movements of the control column applies differential rotations to the pulleys. Fore and aft movement applies equal rotation in the same sense to the pulleys 104 and 105, to increase (or decrease) equally the collective pitch angles of rotors 54 and 55, and a contrary rotation of greater extent to the pulley 106, to vary the collective pitch angle of rotor 56 in the opposite sense, the rotations of the several pulleys being proportional to the projections of arms 89, 90 and 77 on the pitching plane; and lateral movement of the control column applies equal and opposite rotations to pulleys 104 and 105 to apply equal and opposite rotations to pulleys 104 and 105 to apply equal and opposite variations to the collective pitch angles of rotors 54 and 55, and no rotation to pulley 106.

It will readily be seen that the spider mechanism illustrated in Fig. 13 ensures that for any displacement of the control column the algebraic sum of the rotations imparted to pulleys 104, 105 and 106 is zero, and hence, the total lift of the three rotors remains constant, at least in hovering flight.

A rudder-bar 107 (see Figs. 10 and 13) is mounted on a vertical pillar 108, which is supported in a bearing 109, and carries a crank 110 connected by a push-pull rod 111 to the vertical arm of a bell-crank 112, whose horizontal arm is connected by a vertical link 113 with a two-armed lever 114 pivoted on a fore and aft horizontal axis at 115. The arms of lever 114 are respectively connected by push-pull rods 116, 117 with cranks 118 and 119 (see Fig. 14) operating pulleys 120 and 121 carrying cables 122, 123 which are led over jockey pulleys 124, and operate pulleys 125 and 126 coaxial with the hubs 197, 198 of the side by side rotors.

Movements of the rudder-bar apply equal and opposite rotations to the pulleys 125, 126 the direction of rotation depending on whether "port" or "starboard" rudder is applied. The pulleys 125, 126 operate the cyclic pitch control mechanisms of the rotors 54, 55. The mechanism, which has been described with reference to Figs. 1 to 4, varies the amplitude and sign of the cyclic pitch variation, but not its phase, the zero phase being substantially in the fore and aft azimuth. Variation of the cyclic pitch amplitude therefore varies the inclination of the lift vector in the fore and aft azimuth, and consequently varies the horizontal component of the lift in that azimuth; and the opposed rotations of pulleys 125, 126 therefore introduce opposed or differential cyclic pitch control of the two side by side rotors, giving equal and opposite variations of the fore and aft horizontal components of the lift, producing equal yawing moments of the same sign, without introducing any transverse force.

In the specific example of Figs. 5 and 6, there are three concentric control shafts, coaxial with the hub, viz. 10, 11 and 12. The inner shaft 10 supports a rotary swash-plate 18 on a gimbal mounting 13, 14, 15 which carries a ring 16 constituting the centre member (non-rotative) on which the swash-plate rotates on bearings 17. The swash-plate has arms 19 connected in the usual way to the pitch-change levers of the rotor blades (not shown) by ball-joints 20 and links 21.

The intermediate tubular shaft terminates in an inclined or Z crank 22 carrying an inclined ring 23 on a bearing 24, and the outer tubular shaft 12 terminates in an inclined crank 25 carrying an inclined ring 26 on a bearing 27; and rings 23, 26 are respectively provided with arms 28 and 32 in mutually perpendicular vertical planes, which are respectively connected with the gimbal ring 14 and with the swash-plate centering ring 16 by links 30, 34 pivoted to the rings 14, 16 at 31, 35 and connected to the arms 28, 32 by ball-joints 29, 33 respectively.

It will be seen by analogy with the preceding example that rotation of shafts 11 and 12 rocks the rings 23, 26 in mutually perpendicular planes and these rocking displacements are transmitted by the linkages 28 to 31 and 32 to 35 to the swash-plate assembly 16, 17, 18.

The shafts 11, 12 are respectively provided with operating pulleys 36, 37 rotation of which displaces the swash-plate independently in two mutually perpendicular planes.

Collective pitch control is effected by raising and lowering the inner shaft 10 axially, for which purpose, in this example, an ordinary bell-crank 38 and operating rod 39 are provided instead of the Z-crank arrangement of the preceding example, which may be incorporated as an alternative, e. g. by providing a further coaxial sleeve enclosing the sleeve 12 and having a Z-crank carrying a loose ring anchored as at 134 in Figs. 1 to 4 the additional sleeve being provided with a (third) operating pulley and an abutment on a thrust bearing mounted on sleeve 12 by means of which the swash-plate assembly is raised and lowered by the additional sleeve, when the latter is partially rotated.

The installation of the control mechanism shown in Figs. 5 and 6 in a typical single-rotor helicopter is illustrated in Figs. 16 and 17 and comprises a body 40, rotor mounting pylon structure 41, and a secondary gear-box 42 which houses the bearings supporting a rotor hub 43, on which are articulated rotor blades 44. The rotor is driven by an engine 45, through gears, contained in a primary gear-box 46, and a transmission shaft 47, which drives the hub 43 through gears 60, 61 enclosed in the secondary gear-box 42.

The rotor blades 44 are articulated by means of drag pivots 219, drag links 218 and flapping pivots 217 to the hub 43. The blades 44 are mounted on their root stubs by means of pitch-varying pivots (not shown) and have integral levers 220 articulating with the links 21 at ball joints 221 which lie on the axes of the corresponding flapping pivots 217.

The control circuits comprise a control column 200 pivoted for fore and aft movement at 201 on a rocking shaft 202, the fore and aft motion being transmitted through a push-pull rod 203 and a crank 204 to a pulley 205 carrying an endless cable 206 which passes over jockey pulleys 207 to the pulley 36 previously described. The rocking shaft 202 carries a pulley 208 which transmits lateral rocking motion of the control column to the pulley 37 by means of an endless cable 209, which passes over jockey pulleys 210.

The rod 39, which as previously explained controls the collective pitch of the rotor blades, is connected by means of a bell crank 211, rod 212, bell crank 213 and rod 214 with a crank 215 rigid with a "pitch lever" 216.

These control circuits operate in the conventional manner, which is well understood in the art, and no further explanation of their operation is needed.

It is to be understood that the accompanying drawings, illustrative of specific examples of apparatus embodying the invention, are not to scale and are largely of a conventional nature; no significance is to be attached to the dimensions of any part shown, nor are these drawings in any way to be looked on as a guide to detail design, except in so far as the text of the description may otherwise direct.

We claim:

1. In a helicopter or like rotary-winged aircraft having a lifting or sustaining rotor with a rotor hub, mechanism for controlling the pitch angles of the rotor blades of the lifting or sustaining rotor including a rotative swash ring connected to the rotor blades and being tiltable and displaceable axially of the rotor, a non-rotative swash ring on which the rotative ring is journalled, a gimbal ring for mounting the non-rotative swash ring, a vertically movable support for the gimbal ring, a shaft coaxial with the rotor hub and provided with a Z-crank carrying a loose ring, and a connection between said loose ring and the gimbal ring providing for angular tilting of the gimbal ring and thus of the swash rings.

2. A construction in accordance with claim 1 and further including a second shaft arranged coaxially of the rotor and provided with a Z-crank carrying a loose ring, and a connection between the gimbal ring and the second loose ring providing for angular tilt of the gimbal ring upon rotation of the second shaft.

3. A construction in accordance with claim 2 in which the connections between said loose rings and said gimbal ring are angularly offset from each other 90° about the axis of the rotor.

4. A construction in accordance with claim 1 in which the support for the gimbal ring comprises a shaft arranged coaxially of the rotor, said shaft being nonrotative, the arrangement further including control linkage associated with the lower end of the shaft for vertically moving the shaft.

CYRIL GEORGE PULLIN.
KENNETH WATSON.

REFERENCES CITED

The following references are of record in the file of this patent:

FOREIGN PATENTS

| Number | Country | Date |
|---|---|---|
| 702,159 | Germany | Jan. 31, 1941 |